March 15, 1938.    R. H. WRIGHT    2,111,017
DOOR CHECK
Filed Oct. 29, 1937
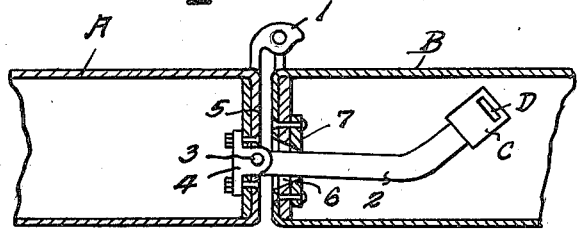
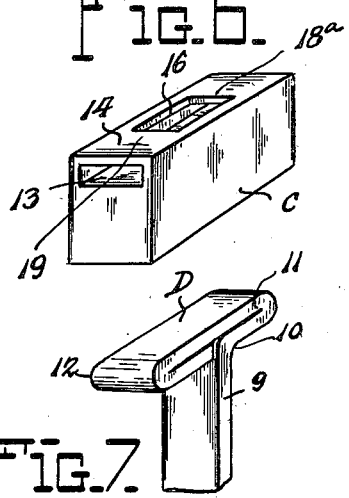
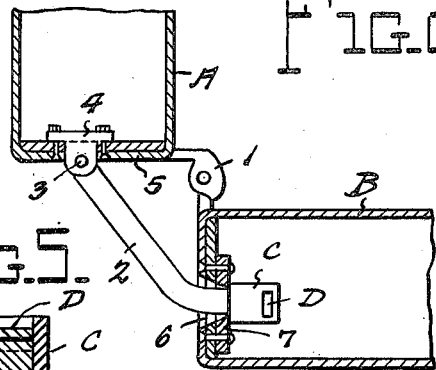
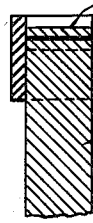
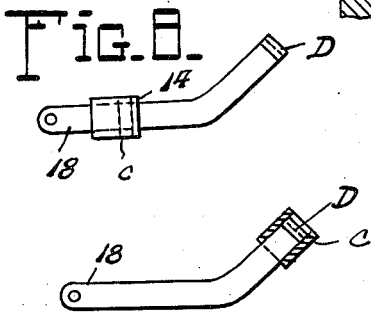
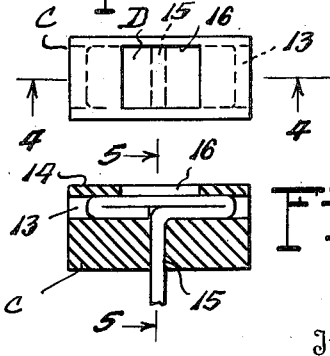
Inventor
RICHARD H. WRIGHT.
By Robert Cobb
Attorneys Patented Mar. 15, 1938

2,111,017

UNITED STATES PATENT OFFICE 2,111,017

DOOR CHECK

Richard H. Wright, Cleveland Heights, Ohio

Application October 29, 1937, Serial No. 171,766

8 Claims. (Cl. 16—86)

Door checks of the type of the present invention for limiting the opening movement of vehicle doors are ordinarily made in huge quantities so that any reduction in their cost of manufacture effects a tremendous saving.

Door checks of the type of the present invention ordinarily comprise a check arm having a pivotal connection with a hinge edge of a door and a bumper attached to the opposite end of the arm or shank portion of the door check for reducing the shock incident to abutment of the bumper member with the abutment portion of the vehicle body.

For maintaining the bumper member on the shank portion of the door check, some form of retaining member is usually availed of and ordinarily comprises a washer which is locked in a slot of the shank. The assembling operation, therefore, involves at least the steps of emplacing the bumper on the shank portion of the door check arm and then assembling the retaining member thereupon and finally locking the retaining member in position to retain the bumper member upon the check arm.

The number of separate parts necessary to the manufacture of door checks of this type, the cost of making such separate parts, and the time involved in their assembly, makes desirable a reduction in the number of separate parts required and greater ease in the assembling of the resultant article of manufacture.

With the above factors in mind, it has been an object of the present invention to produce a door check of the type described, wherein the number of separate parts has been reduced to a minimum and greater facility in their assembling obtained. It has been an especial object of the present invention to design a door check bumper which may be readily formed by an extrusion process of the rubber or like material body, of which it is made.

A still further object of the invention has been to design a check arm which has the bumper retaining member formed integrally therewith, and with which the bumper formed in the manner set forth may be quickly and permanently attached.

Further objects and advantages of the invention will appear more fully in connection with the detailed description and the drawing, in which:—

Figure 1 is a horizontal sectional view through a door and body structure at the point of attachment of the door check, the parts being shown in their relative positions as when the door is closed.

Figure 2 is a view similar to Figure 1, but showing the parts in their relative positions when the door is open.

Figure 3 is a view of the door check bumper and retaining member as seen in end elevation.

Figure 4 is a vertical sectional view on the line 4—4 of Figure 3 showing the door check bumper retaining member and shank portion of the door check arm.

Figure 5 is a horizontal sectional view of the same parts taken on the line 5—5 of Figure 4.

Figure 6 is a perspective view of the novel bumper construction of the invention.

Figure 7 is a perspective view of the shank portion of the door check showing the integral formation of the retaining member at one end thereof.

Figure 8 is a top view of the door check showing a step in the assembly of the bumper upon the door check or arm, as when the shank portion thereof is being inserted through the transverse passage through the bumper member.

Figure 9 is a view similar to Figure 8 but showing the assembled condition of the parts, the bumper member being shown in section.

The door of an automobile or a like vehicle is indicated generally at A, is hingedly connected to the body of the vehicle as by a hinge 1. The shank or arm 2 of a door check is pivotally connected as at 3 to a bracket 4 suitably mounted at the hinge edge 5 of the door A.

An opening 6 is provided in the body section B through which the arm 2 of the door check may extend into the interior thereof, and is provided with an abutment member 7 for abutment with the bumper or buffer member, generally indicated at C, for limiting the outward swing of the door when opened.

The door check arm 2 is formed of flat bar material, the flat sides of which lie in a generally horizontal position. In the formation of the check arm, the outer end portion thereof is bent at right angles to the shank portion 9 as at 10, and then folded upon itself as at 11, and finally again folded upon itself as at 12 to form a T-shaped structure, the bent portion D of which constitutes a retaining member or portion.

It is, therefore, to be seen that this construction affords a retaining member integrally formed with the door check arm enabling the retaining portion thereof to be formed at the same time that the check arm itself is stamped out since the manufacture of these check arms utilizes a stamping operation in which the shank portion is stamped in the desired shape and the pivot hole at one end thereof is formed therein. This construction of door check arm is one which may, therefore, be formed with its retaining member in one simple stamping operation and eliminates the necessity for separate arm and retaining member parts as well as the necessity of assembling of such separate parts.

The resilient bumper member generally indicated at C is preferably formed of rubber or like material and is formed with a longitudinal passage 13 therethrough. Said passage preferably lies nearer one edge 14 of the body than the other. Transversely of the body of material and intersecting the passage 13 at about the middle thereof the bumper is formed with a passage 15, the dimensions of which approximate the width and thickness of the shank portion of the door check arm so that the bumper member C will snugly fit upon the arm 2 when said arm is inserted through the passage 15.

Similarly, the dimensions of the passage 13 approximate the width and thickness of the retaining member or portion D.

An enlarged opening 16 is provided in the bumper member C and is of smaller dimensions than the retaining member D, said opening 16 communicating with the passage 13 and lying opposite the intersection of passages 13 and 15.

An important advantage of the construction described is that the rubber bumper C may be formed by an extrusion process wherein the body of rubber is forced through a die forming the passage 13 and when the extruded rubber has been severed into suitable lengths, it is a simple matter to cut the communicating passage 15 and the opening 16 in the rubber bumper units thus formed.

The process of assembling the rubber bumper C upon the check arm 2 is extremely simple. The pivot end 18 of the check arm 2 is inserted through the opening 16 and through the passage 15 of the bumper C until the retaining portion D abuts with the edge 14 of the bumper. Thereupon the walls 18a and 19 of the opening 16 are stretched outwardly in the direction of the length of the bumper C to permit the passage of the retaining portion D through the opening 16 and into the passage 13, where it is snugly seated upon release of the stretching pressure upon the walls 18a and 19 of the opening 16. When assembled upon the check arm in the manner just described, the bumper C becomes permanently unitary therewith and may not be displaced from its proper position in the operation of the door check in its intended use.

It is to be understood that the advantages of the novel check arm with its retaining member formed integrally therewith may be availed of without reference to the novel bumper member C described herein, and similarly, the novel construction of the bumper member may be availed of in connection with a door check arm without reference to the particular construction of door check arm herein described.

Preferably, however, the novel constructions of both the door check arm and the bumper, as described, will be availed of because these parts have been designed with their peculiar cooperation in mind.

Having thus described my invention, what I claim as new and desire to secure by Letters Patent of the United States is:—

1. As a new article of manufacture, a bumper for door checks, comprising a body of extruded rubber or like material formed with a transverse passage therethrough adapted to enable the bumper to fit snugly upon the shank portion of a door check arm, and said body also being formed with a longitudinal passage therethrough adapted to accommodate the retaining member of a door check to enable said bumper to be maintained in fixed relation to said door check.

2. As a new article of manufacture, a bumper for door checks, comprising a body of rubber or like material having a longitudinal passage therethrough, and a transverse passage intersecting said longitudinal passage, the portion of said transverse passage at one side of the longitudinal passage being larger than that at the other side of said latter passage.

3. As a new article of manufacture, a bumper for door checks comprising a body of extruded rubber or like material formed with a longitudinal passage therethrough located nearer one side of the body than the other, a transverse passage intersecting said longitudinal passage at about the middle thereof and an enlarged opening to said passages opposite their intersection.

4. In a door check of the class described, in combination, a check arm having a shank portion, a retaining member mounted upon said arm, and a bumper member mounted upon said arm, said bumper member being provided with a passage through which the shank portion extends, and a second passage in which said retaining member is adapted to seat, whereby said bumper is maintained in fixed position upon the check arm.

5. In a door check of the class described, in combination, a check arm having a shank portion, a retaining member mounted upon said arm, and a bumper member mounted upon said arm, said bumper member being provided with a transverse passage through which said arm extends and a longitudinal passage in which said retaining member is adapted to seat, whereby said bumper is maintained in fixed position upon said check arm.

6. In a door check of the class described, in combination, a check arm having a shank portion, a retaining member mounted upon said arm, and a bumper member mounted upon said arm, said bumper member being provided with a transverse passage through which said arm extends, a longitudinal passage in which said retaining member is adapted to seat, and an opening communicating with said passages of smaller dimensions than the retaining member but through which said member may pass when being seated.

7. In a door check of the class described, in combination, a check arm having a shank portion, a retaining member mounted upon said arm, and a bumper member of resilient material mounted upon said arm, said bumper member being provided with a transverse passage through which said arm extends, a longitudinal passage in which said retaining member is adapted to seat, and an opening communicating with said passages opposite the intersection thereof and of smaller dimension than the retaining member but through which said member may pass in being seated, the material surrounding said opening being adapted to be stretched to permit passage of the retaining member therethrough.

8. In a door check of the class described, in combination, a check arm having a pivot portion at one end thereof and being formed with a retaining portion at the opposite end, and a bumper member mounted upon said arm and being provided with a transverse passage through which said arm extends, a longitudinal passage in which said retaining portion is adapted to seat, and an opening communicating with said passages of smaller dimensions than the retaining member but through which said member may pass when being seated.

RICHARD H. WRIGHT.